(12) United States Patent
Kameyama

(10) Patent No.: US 8,090,367 B2
(45) Date of Patent: Jan. 3, 2012

(54) INFORMATION PROVIDING SYSTEM FOR VEHICLE

(75) Inventor: Shogo Kameyama, Chiryu (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 386 days.

(21) Appl. No.: 12/407,400

(22) Filed: Mar. 19, 2009

(65) Prior Publication Data

US 2009/0247151 A1    Oct. 1, 2009

(30) Foreign Application Priority Data

Mar. 25, 2008   (JP) ................................ 2008-078584

(51) Int. Cl.
*H04W 4/00* (2009.01)
*H04B 7/00* (2006.01)

(52) U.S. Cl. ................. 455/426.1; 455/569.2; 455/99; 455/345; 455/41.2; 455/41.3; 379/406.02; 379/406.03

(58) Field of Classification Search ................. 455/3.06, 455/403–404.2, 414.1–414.4, 575.9, 556.1, 455/90.1–90.3
See application file for complete search history.

(56) References Cited

U.S. PATENT DOCUMENTS

| | | | |
|---|---|---|---|
| 6,615,186 B1 * | 9/2003 | Kolls | 705/14.51 |
| 2002/0055890 A1 | 5/2002 | Foley | |
| 2003/0154126 A1 * | 8/2003 | Gehlot et al. | 705/14 |
| 2006/0155665 A1 | 7/2006 | Sekiyama | |
| 2007/0005206 A1 | 1/2007 | Zhang et al. | |
| 2007/0078708 A1 * | 4/2007 | Yu et al. | 705/14 |
| 2008/0274688 A1 * | 11/2008 | Kirby et al. | 455/3.06 |
| 2009/0232288 A1 * | 9/2009 | Forbes et al. | 379/93.23 |
| 2009/0327263 A1 * | 12/2009 | Maghoul | 707/5 |

FOREIGN PATENT DOCUMENTS

| | | |
|---|---|---|
| JP | 2001-076002 | 3/2001 |
| JP | 2002-203028 | 7/2002 |
| JP | 2003-022278 | 1/2003 |
| JP | 2006-120046 | 5/2006 |
| JP | 2007-174441 | 7/2007 |

* cited by examiner

*Primary Examiner* — Ajit Patel
*Assistant Examiner* — Erica Navar
(74) *Attorney, Agent, or Firm* — Nixon & Vanderhye PC

(57) ABSTRACT

A cellular phone accumulates input information, which is inputted by a user using the cellular phone located not only inside but also outside of a vehicle, as parent population data for interest extraction, and extracts interest information, which reflects a present interest of a user, from the parent population data for interest extraction. An in-vehicle information output apparatus internally or externally collects provision information, which matches the interest information extracted in the cellular phone, and provides the user with the collected provision information.

19 Claims, 13 Drawing Sheets

FIG. 4A

| KEYWORD | FREQUENCY | |
|---|---|---|
| TIRE | 50 | — 321a |
| SNOW | 47 | |
| SKI | 30 | |
| ⋮ | ⋮ | |

FIG. 4B

| URL | DESTINATION | FREQUENCY |
|---|---|---|
| www.snowresist-tire.co.jp | SNOW-RESIST TIRE | 10 |
| www.greatnagano-skiresort.ne.jp | GREAT-NAGANO SKI-RESORT | 7 |
| www.funky-spa.com | FUNKY SPA | 3 |
| ⋮ | ⋮ | ⋮ |

(321b)

| DATE | USER | DESTINATION | CLASS | FREQUENCY |
|---|---|---|---|---|
| 2003.3.1 | MOTHER | SHOP A | NJC2 | 2 |
| 2003.3.1 | MOTHER | RESTAURANT A | NJC1 | 1 |
| 2003.3.2 | FATHER | RESTAURANT B | NJC1 | 8 |
| 2003.3.8 | FATHER | RESTAURANT C | NJC1 | 2 |
| ⋮ | ⋮ | ⋮ | ⋮ | ⋮ |
| 2003.8.3 | ALL FAMILY | SEASHORE A | NJC3 | 1 |
| 2003.8.3 | ALL FAMILY | RESTAURANT D | NJC1 | 1 |
| ⋮ | ⋮ | ⋮ | ⋮ | ⋮ |

21d

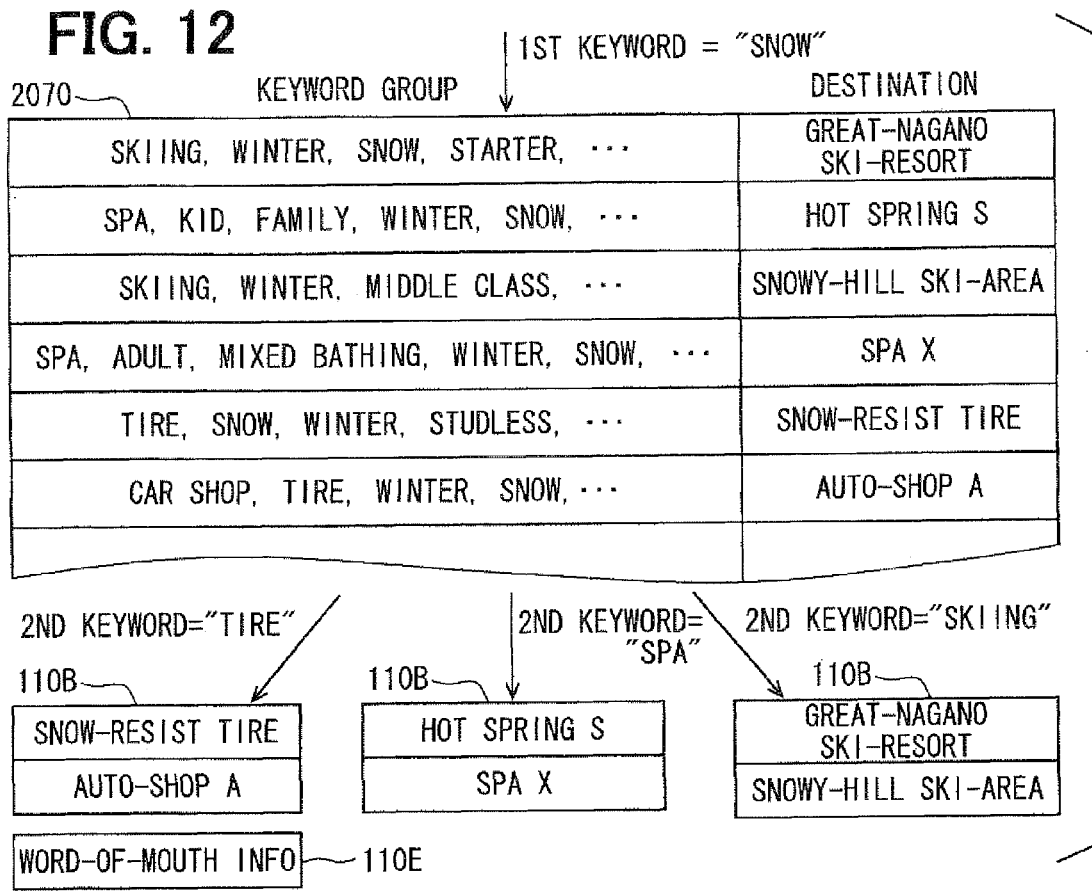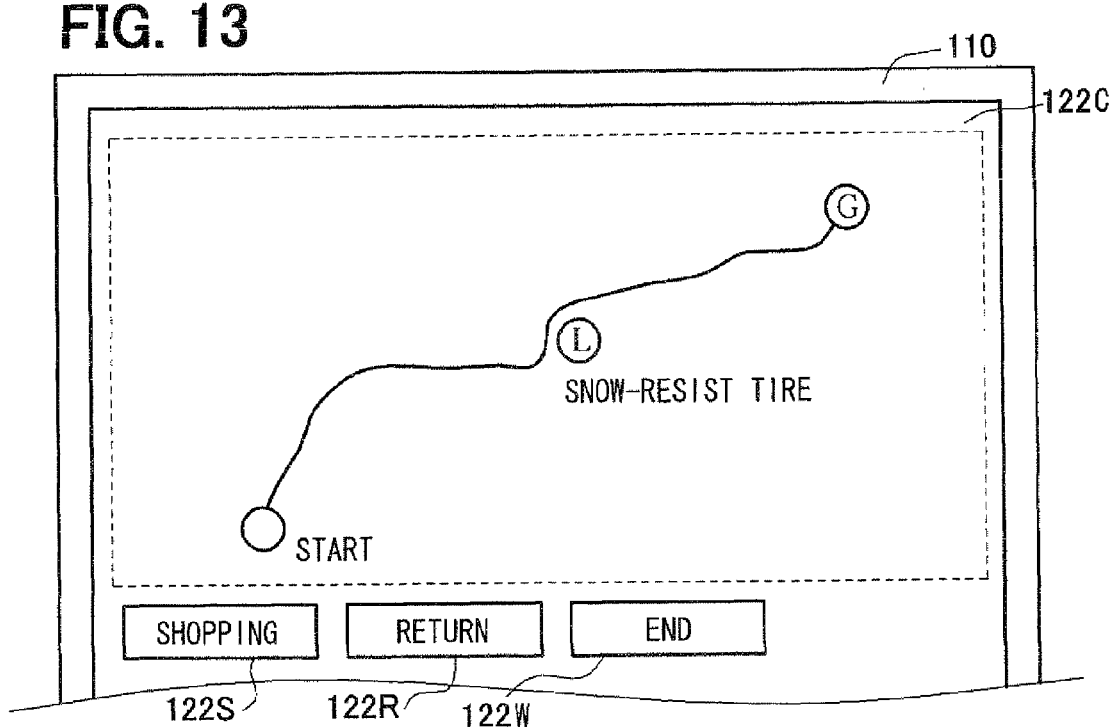

FIG. 14 http://www.snowresist-tire.co.jp/catalog/studless2007

2007 NEW WINTER MODEL

| PHOTO | MAKER | PRODUCT | PRICE(FOUR WHEEL) |
|---|---|---|---|
|  | MAX TIRE | KM-2000KM | ¥87500 |
|  | BABA TIRE | STRONG 200 | ¥88000 |
|  | KAMEYAMA RUBBER | DRIFT 10 | SOLD OUT |

FIG. 15 http://www.maxtire.com/km-2000km/

IT'S AMAZINGLY ATTRACTIVE IN SNOW THIS WINTER

KM-200KM

....

ALSO FOR FROZEN SURFACE

RETURN

MAX TIRE CORPORATION

INFORMATION PROVIDING SYSTEM FOR VEHICLE

CROSS REFERENCE TO RELATED APPLICATION

This application is based on and incorporates herein by reference Japanese Patent Application No. 2008-78584 filed on Mar. 25, 2008.

FIELD OF THE INVENTION

The invention relates to an information providing system for a vehicle.

BACKGROUND OF THE INVENTION

Patent document 1: JP-2007-174441 A
Patent document 2. JP-2007-11380 A (corresponding to USP-2007/0005206)

In recent years, a technology has been actively developed which establishes a mutual communication link between a cellular phone and an in-vehicle information providing apparatus such as a car navigation apparatus. For example, by using an input/output interface of the car navigation apparatus, a bi-directional short range wireless network such as Bluetooth (registered trademark) communication is established with a cellular phone to thereby achieve a handsfree call technology. For instance, Patent document 2 discloses the following interface. The above cellular phone wirelessly communicated with the navigation apparatus can be used for an input terminal of the navigation apparatus or a terminal to connect with an external network such as the Internet. Images or songs, which are downloaded via the cellular phone, can be thereby transmitted wirelessly to the car navigation apparatus to be outputted in a monitor of the car navigation apparatus. Further, such an interface can be already available in the market as a wireless connection adaptor (e.g., a product of PDI-B922 of I-O DATA DEVICE, INC. in Japan).

The above prior art technology intends to improve operability and convenience of the car navigation apparatus by combining with a cellular phone, rather than aiming to flexibly respond to a variety of user tastes. For instance, an example of responding to a user taste is a learning function which simplifies an operation for designating a favorite route or a destination, which is visited recently, based on a history of accessing map data or a history of operations performed inside vehicles. Herein, for a large majority of users except professional drivers, the time period of use for vehicles occupying a daily life is short on the whole, making it difficult to obtain sufficient time period to allow the service contents to match the individual tastes. Further, in order to match individual tastes shortly, it is assumed that a user answers a questionnaire requested by a dealer or the like to thereby customize various setting items inside the vehicle. However, in such a case, it is impossible to reflect the newest hobby and interest of individual user on the setting items, each time an event occurs. In addition, providing such a service is limited to a vehicle purchased by a car dealer.

SUMMARY OF THE INVENTION

It is an object of the present invention to provide an information providing system to more densely collect information reflecting user's newest hobbies and interests not only inside but also outside of a vehicle and also respond to various kinds of tastes appropriately.

According to an example of the present invention, an information providing system for a vehicle is provided as follows. The system includes (i) an in-vehicle information output apparatus mounted to the vehicle and (ii) a cellular phone capable of communicating with the in-vehicle information output apparatus. Further, an input information acquisition section is provided in the cellular phone for acquiring input information based on at least one of (i) a speech of a user's telephone call using the cellular phone located not only inside but also outside of the vehicle and (ii) address information of a user's browse to an external network using the cellular phone located not only inside but also outside of the vehicle. A population accumulation section is provided in the cellular phone for accumulating, as a parent population data, input information acquired by the input information acquisition section within a predetermined period up to a present time. An interest information extraction section is provided in the cellular phone or the in-vehicle information output apparatus for extracting interest information reflecting a present interest of the user from the accumulated parent population data for interest extraction. A provision information collection section is provided in the in-vehicle information output apparatus for collecting provision information, which matches the extracted interest information. An information output section is provided in the in-vehicle information output apparatus for outputting the collected provision information in an image, a sound, or a combination of an image and a sound.

As another example of the present invention, a method is provided for outputting provision information in a vehicle for a user of the vehicle in cooperation with a cellular phone of the user. The method comprises: acquiring input information based on at least one of (i) a speech of a user's telephone call using the cellular phone located not only inside but also outside of the vehicle and (ii) address information of a user's browse to an external network using the cellular phone located not only inside but also outside of the vehicle; accumulating, as a parent population data, input information acquired within a predetermined period up to a present time; extracting interest information reflecting a present interest of the user from the accumulated parent population data for interest extraction; collecting provision information, which matches the extracted interest information; and outputting, for the user located in the vehicle, the collected provision information in an image, a sound, or a combination of an image and a sound.

Under the above configurations of the examples, the speech of the telephone call using the cellular phone or address information of the browse to the external network using the cellular phone can be obtained in a daily operation of the cellular phone by the user without need of limiting the location only to the inside of the vehicle. In other words, they can be acquired from the user's daily behavior outside the vehicle typically occupying much longer time period than that inside of the vehicle; thereby, the user's interest can be appropriately specified base on such accumulated input information.

BRIEF DESCRIPTION OF THE DRAWINGS

The above and other objects, features, and advantages of the present invention will become more apparent from the following detailed description made with reference to the accompanying drawings. In the drawings:

FIG. 4A is a schematic diagram illustrating an example of keyword statistical data; FIG. 4B is a schematic diagram illustrating an example of access statistical data;

FIG. 12 is a schematic diagram illustrating a second, third, and fourth output examples of a retrieval result in an event of a narrowing down;

FIG. 13 is an example of a destination designation display window responding to the second output example;

FIG. 14 is a first example of a contents display window of a web site;

FIG. 15 is a second example of a contents display window of a web site;

DETAILED DESCRIPTION OF THE PREFERRED EMBODIMENTS

Figure 1:
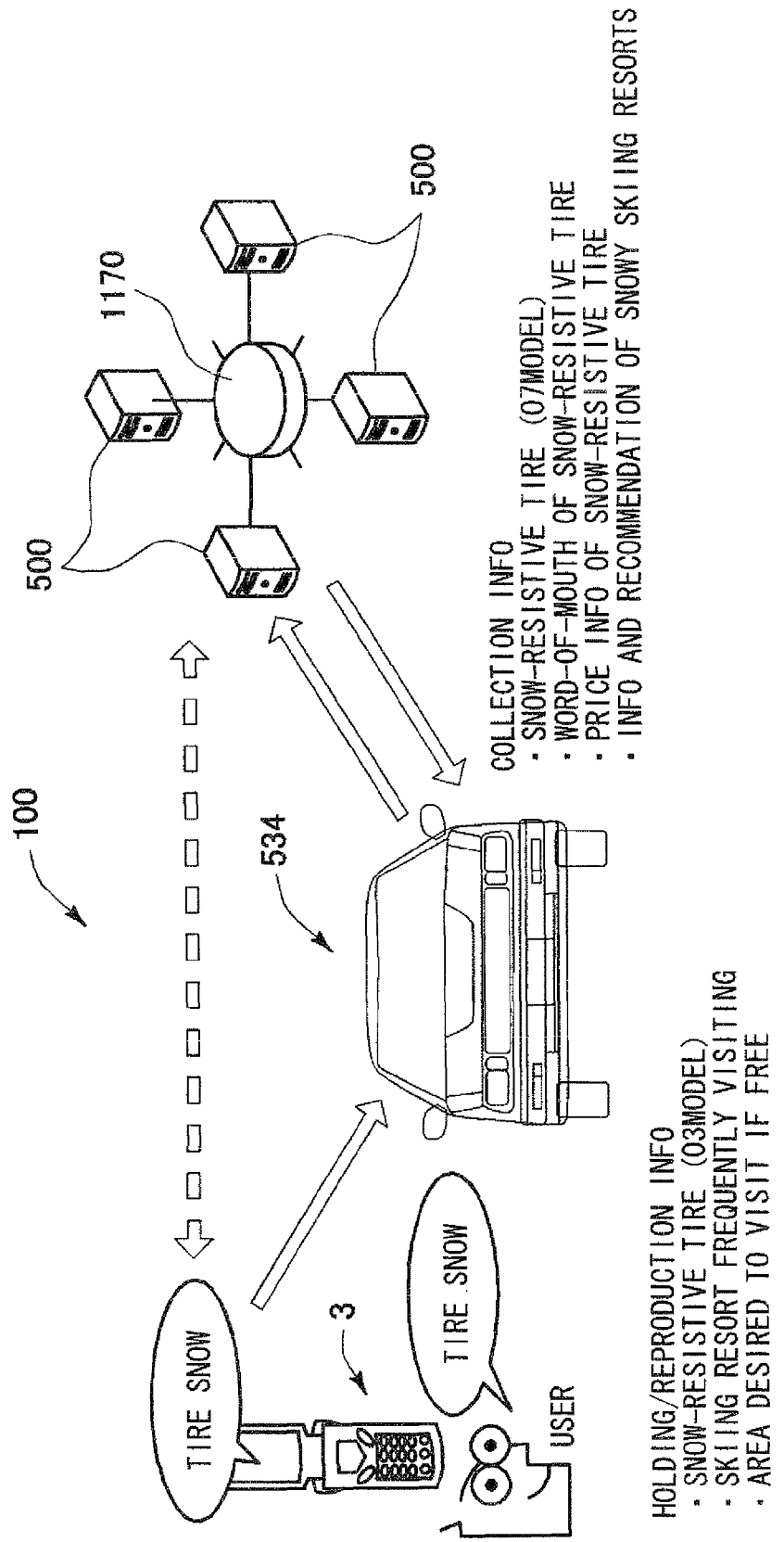
FIG. 1 is a diagram schematically illustrating an information providing system for a vehicle according to an embodiment of the present invention.

An embodiment of the present invention will be described in further detail with reference to the accompanying drawings. FIG. 1 is a diagram schematically illustrating an information providing system 100 for a vehicle according to an embodiment of the present invention. The information providing system 100 includes an in-vehicle information output apparatus 534 (also referred to as a vehicle-side information output apparatus) mounted in a subject vehicle and a cellular phone 3 which can communicate with the in-vehicle information output apparatus 534.

Figure 2:
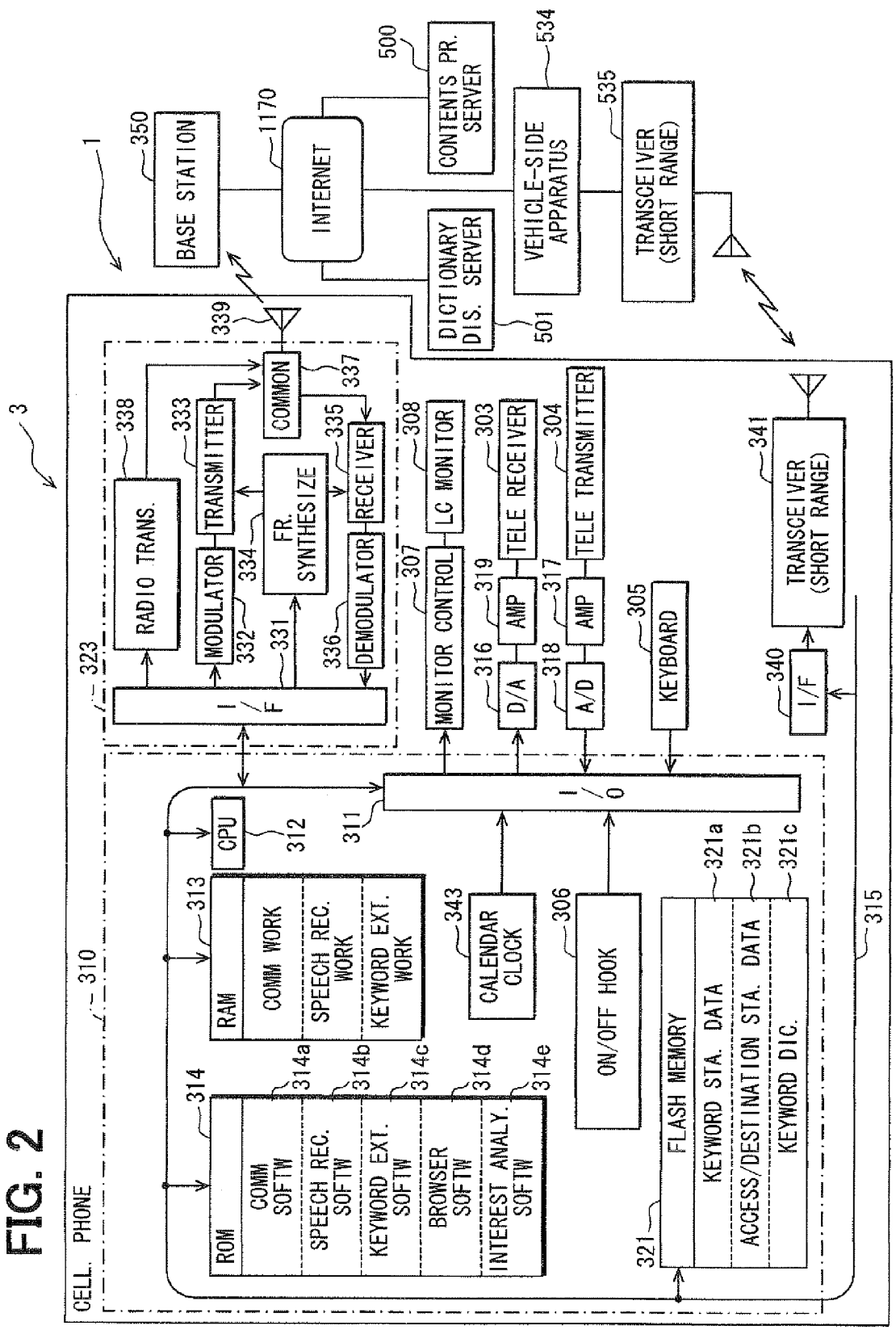
FIG. 2 is an example of an electrical block diagram showing a configuration of a cellular phone.

FIG. 2 is an example of an electrical block diagram showing a configuration of the cellular phone 3. A control section 310, which is a main component of the cellular phone 3, is a hardware microcomputer having an I/O port 311, a CPU 312, a RAM 313, a ROM 314, a nonvolatile flash memory 321, and a bus 315, which connects the foregoing therebetween. The ROM 314 stores a communication software program 314a for telephone calls and accesses to the Internet, a speech recognition software program 314b, a keyword extraction software program 314c, a browser software program 314d, and an interest analysis software program 314e. Such software programs stored in the ROM 314 are individually executed by the CPU 312 with the RAM 313 being used as a work area. Further, the flash memory 321 stores keyword statistical data 321a, access/destination statistical data 321b, and a keyword dictionary 321c for interest extraction. The keyword statistical data 321a may function as an example of a parent population accumulation means or section for interest extraction or a keyword accumulation means or section. Further, the parent population accumulation section can include a keyword accumulation means or portion. The access/destination statistical data 321b is related to (i) accesses to Internet websites and (ii) destinations associated with Internet websites.

Further, a keyboard 305 as an information input section and on-hook/off-hook switch 306 are connected to the I/O port 311. In addition, a telephone transmitter 304 as an information input section is connected to the I/O port 311 via an amplifier 319 and an D-A converter 316; a telephone receiver 303 is connected to the I/O port 311 via an amplifier 317 and an A-D converter 318. In addition, a first transceiver section 323 for telephones and Intel net (external network) connections is connected to the I/O port 311. The first transceiver section 323 includes an interface 331 connected to the bus 315, a modulator 332 connected to the interface 331, a transmitter 333, a frequency synthesizer 334, a receiver 335, a demodulator 336, and a common section 337.

When the cellular phone 3 performs a telephone call, a transmission and reception with a telephone as a call partner is performed according to a predetermined protocol via a wireless base station 350 and a telephone network (not shown). That is, an analog sound signal inputted from the telephone transmitter 304 is amplified by the amplifier 317 and digitized by the A-D converter 318 to be thereby inputted to the control section 310. The digitized sound signal is encoded according to a predetermined compression format by the control section 310 and inputted as a base band signal to the modulator 332 via the interface 331. Further, the frequency synthesizer 334 outputs a carrier wave signal to the transmitter 333. The carrier wave signal undergoes a modulation by a base band signal and a spectrum spread process (secondary modulation) with help of input from the modulator 332 to be thereby transmitted as a telephone call transmission signal to an antenna 339 via the common section 337. In contrast, a telephone call reception signal received by the antenna 339 is inputted to the receiver 335 via the common section 337, and undergoes a synchronous detection using a carrier wave signal outputted from the frequency synthesizer 334 to be thereby demodulated to a base band signal through a reverse spread process. The base band signal is decoded and transformed into an analog sound signal by the D-A converter 316 connected with the input/output port 311 to be thereby outputted via the telephone receiver 303.

Next, when the cellular phone 3 performs an access to the Internet, a transmission and reception with one of contents provision servers 500 as information provision servers is performed according to a predetermined protocol for Internet accesses via the wireless base station 350 and the Internet 1170 as an external communication network. Modulation and demodulation operations in the first transceiver section 323 at the above operation are almost the same as that at the operation of the telephone call. The browser software program 314d is executed and a URL (Uniform Resource Locator) is inputted using the keyboard 305 or the like. Thereby, a contents file is received from the corresponding contents provision server 500 including a website. The display data for an image, character, etc. contained in the contents file is outputted via a monitor 308 while a sound signal is outputted via the telephone receiver 303 functioning as a speaker.

In addition, the interface 331 is connected with a radio transmission section 338 which transmits a control-use radio wave P. The control-use radio wave P is transmitted from the antenna 339 via the common section 337. When the cellular phone 3 moves to another neighboring communication zone, a well-known handover is processed by a wireless circuit control station in the network based on the receiving condition of the control-use radio wave P.

The bus 315 is further connected via an interface 340 with a vehicle-side transceiver section 341 (e.g., Bluetooth interface in the present embodiment), which directly communicates with the vehicle-side information output apparatus 534. The transceiver section 341 and a vehicle-side transceiver section 535 of the in-vehicle information output apparatus 534 in FIG. 3 form a bi-directional short range wireless network.

Next, the speech recognition software program (functioning as a speech recognition means or section) 314*b* stored in the ROM 314 executes a transliteration of a spoken language inputted by the user via the telephone transmitter (i.e., microphone) 304 using a known algorithm applying to the Hidden Markov Model. For instance, a character string obtained as a result of the speech recognition (also referred as a speech-recognized result) follows a grammatical rule of an adopted language, and is being speech-recognized in the manner to be decomposed into words while adding context analysis as required.

The keyword extraction software program (functioning as a keyword extraction means or section) 314*c* extracts a keyword, which is used for designating a user's interest from the input contents speech-recognized (i.e., recognized by the speech recognition). The flash memory 321 functioning as a keyword dictionary storage section stores a keyword dictionary 321*c* which covers or contains a keyword group previously selected for interest extraction. The keyword extraction software program 314*c* collates the speech recognition result, which is decomposed into words, with the keyword group registered in the keyword dictionary 321*c* for every word, and extracts selectively only a keyword covered by the keyword dictionary 321*c*.

For example, it is assumed that a user calls to a friend as a call partner using the cellular phone 3, and they have the following conversation, which undergoes the speech recognition.

User: "We seem to have snow this weekend. I am going to visit AUTO-SHOP A to see tires tomorrow. How about going together?"

Partner: We may have much snow this winter because of La Nina decreasing sea surface temperature. Where is that AUTO-SHOP A?"

User: "That AUTO-SHOP A was opened near the Kameyama interchange of the toll road last month."

Partner: "Near the Kameyama interchange, there is another tire specialty store, isn't it?"

User: "Ah . . . , it must be SNOW-RESIST TIRE."

Partner: "The flyer was distributed in this morning. It was telling that a new model in 2007 is cheap."

User: "Let's go to that SNOW-RESIST TIRE first. Could the navigation guide us? By the way, does SNOW-RESIST TIRE have a website?"

Partner: "You had better check it by yourself."

The keyword dictionary 321*c* stores only keywords effective in narrowing down the contents of provision information. For example, keywords should reflect directly the followings: the genres of the information (car accessory, amusement, meal, etc.), kinds of goods or services (tire, skiing, etc.), seasons, or proper nouns (place names, person names, store names, etc.), etc. In the above description about the conversation, such keywords are underlined for highlighting. Thus, if the above conversation are decomposed into words and collated with the keyword dictionary 321*c*, only the keywords which are underlined are extracted.

In addition, the keyword extraction software program 314*c* is accompanied by a dictionary tool which functions as an update means. This dictionary tool is executed periodically to request an external dictionary distribution server 501 to distribute keyword update information via the internet 1170 or another communication network. The keyword update information includes a new keyword group related to seasons, fashions, or newest topics. The keyword dictionary 321*c* is thereby updated by the received keyword update information. For instance, if a new keyword is contained in the keyword update information, it is added. Conversely, if deletion instruction information on a specific keyword is included, the specific one is deleted. For example, a season-specific keyword such as a winter-specific keyword including "snow", "skiing", and "studless tire" is registered in the dictionary within a limited time period (for example, November to April with respect to the above winter-specific keyword) matched with the relevant season, and, then, deleted from the dictionary when the limited time period is completed or ended.

Next, the interest analysis software program 314*e* in the ROM 314 functions as a user interest information extraction means or section. The interest analysis software program 314*e* stores all the keywords extracted within a predetermined past fixed period (referred to as a sampling period, for example, seven to thirty days), which is specified with reference to a calendar clock 343, while including overlapped ones, as the keyword statistical data 321*a* (parent population for interest extraction). Further, the number of times of appearances of each keyword in the keyword statistical data 321*a* is counted. The counted result is also stored as illustrated in FIG. 4A. The old or outdated keyword which comes to be outside the sampling period is deleted from the keyword statistical data 321*a* one by one. Based on the request from the vehicle-side information output apparatus 534, the keyword is transmitted to the vehicle-side information output apparatus 534 from the transceiver section 341 sequentially from a higher order of the counted result.

The cellular phone 3 contains the browser software program 314*d* having functions to access and browse an Internet website (including a website dedicated for accesses from cellular phones). To access the Internet website, and browse the contents file, various known methods can be used in addition to the method of directly inputting the URL of the website to be browsed via the keyboard 305 etc. For instance, an access is made to a retrieval website first, and its linking website list is used for reaching the relevant website. A retrieval is executed by designating a keyword or genre using a retrieval engine to obtain a retrieval list and the relevant URL is selected from the retrieval list to thereby access it. Alternatively, the relevant URL is selected from the favorite list. In any case, the keyboard 305 is used as an information input means or portion of inputting address information. The interest analysis software program 314*e* stores all the URLs accessed within the above-mentioned sampling period while including duplication as the access statistical data 321*b* (i.e., a part of the parent population for interest extraction). Herein, when a URL corresponds to a specific shop or facility, or a sightseeing spot, such a shop or the like is also stored as a destination candidate name in the access statistical data 321*b*. Further, the number of times of appearances of each URL in the access statistical data 321*b* is counted. The counted result is also stored as illustrated in FIG. 4B. The old URL which comes to be outside the sampling period is deleted from the access statistical data 321*b* one by one. Based on the request from the vehicle-side information output apparatus 534, a URL is transmitted to the vehicle-side information output apparatus 534 from the transceiver section 341 sequentially from a higher order of the counted result.

Figure 3:
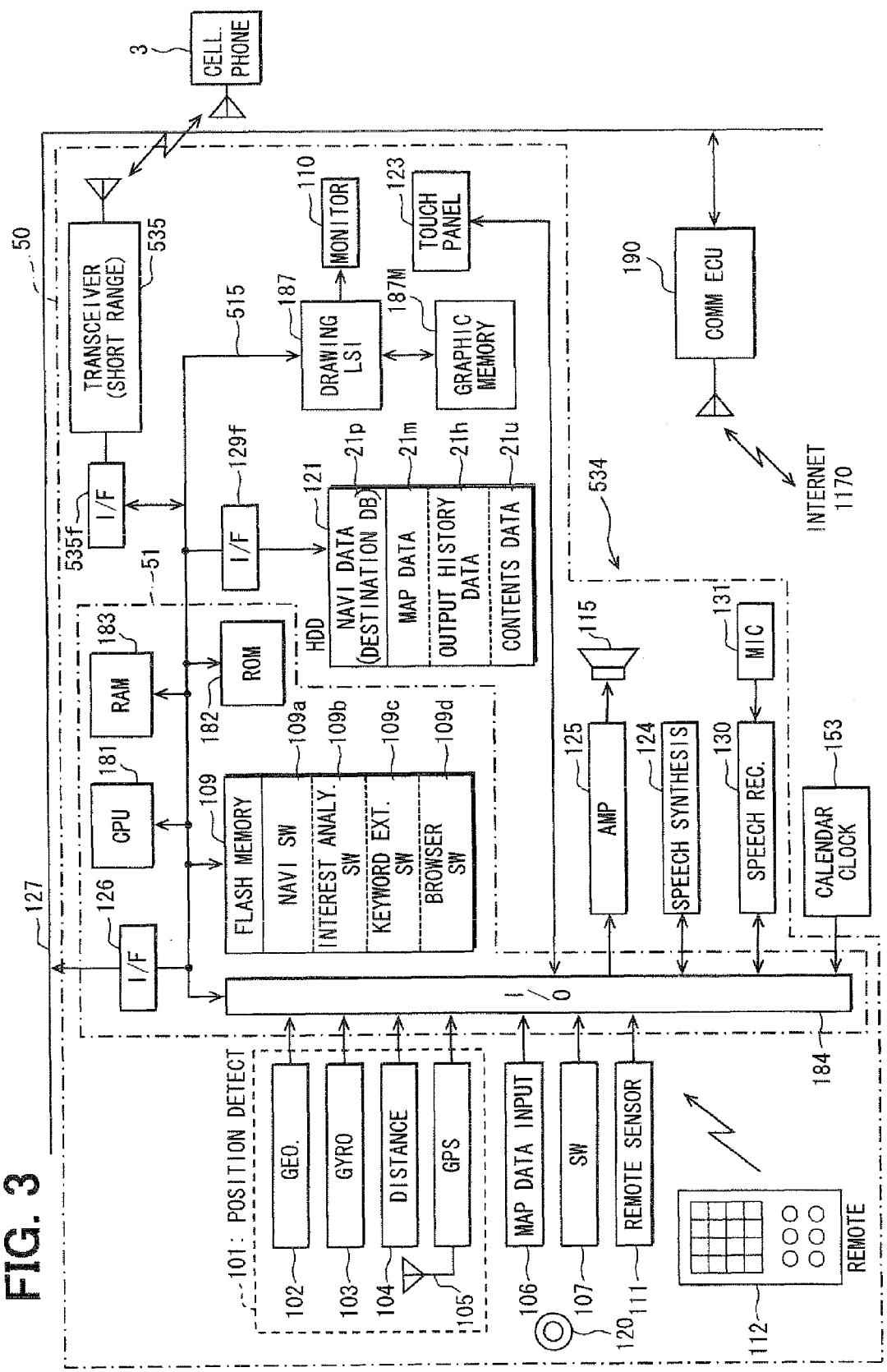
FIG. 3 is an example of an electrical block diagram showing a configuration of an information output apparatus in a vehicle.

Next, FIG. 3 is a block diagram illustrating an example of a configuration of the vehicle-side in-vehicle information output apparatus 534. The vehicle-side information output apparatus 534 is configured as a car navigation apparatus. The vehicle-side in-vehicle information output apparatus 534 includes a position detection section 101; a map data input section 106; an operation switch group 107; a remote control sensor 111; a speech synthesis circuit 124 for audio assist etc.; a speaker 115 for outputting sounds; a flash memory 109 which is nonvolatile memory; a monitor 110 including an LCD etc.; an information ECU (Electronic Control Unit) 51 functioning as a primary control section which is connected with the foregoing sections or the like; a remote control terminal 112; and an HDD (Hard Disk Drive) 121 functioning as a primary storage device.

The position detection section 101 includes following known sensors or the like: a geomagnetic sensor 102, a gyroscope 103, a distance sensor 104, and a GPS receiver 105 for GPS (Global Positioning System) which is used for detecting a present position of the vehicle based on electric waves from satellites. The individual sensors or the like 102 to 105 have different types of detection errors from each other; therefore, they are used to complement each other. In addition, part of the sensors or the like may be used depending on the required detection accuracy or each sensor's detection accuracy. Further, another sensor or the like such as a revolution sensor of steering and a wheel sensor of a following wheel may be used.

Although the operation switch group 107 can use a mechanical switch etc., in the present embodiments a touch panel 123 integrated with the monitor 110 is used together. If a touch-sensitive panel area corresponding to a button image displayed on the monitor 110 is touched by a finger, the operation state can be recognized. This may be called a software button. It is possible to input various instructions by using the operation switch group 107 and the remote control terminal 112.

It is also possible to input various instructions by using the speech recognition unit 130 other than the operation switch group 107 and the remote control terminal 112. That is, the sound is inputted via the microphone 131 connected to the speech recognition unit 130. The relevant sound signal is subjected to the speech recognition process by the known speech recognition technology and transformed to a relevant operation command according to the result.

The information ECU 51 includes mainly a hardware microcomputer having a CPU 181, a ROM 182, a RAM 183, the above-mentioned flash memory 109, an I/O (Input/Output) section 184, and a bus 515 connecting the foregoing therebetween. The HDD 121 is connected with the bus 515 via an interface 129f. In addition, a drawing LSI 187 is connected with the bus 515 while the monitor 110 and a graphic memory 187M for drawing are individually connected with the drawing LSI 187. The drawing LSI 187 outputs an image to the monitor 110 based on drawing information for displaying a map or a navigation operation window. The CPU 181 controls using the navigation software program 109a and data stored in the flash memory 109. The control of data read/write with the HDD 121 is performed by the CPU 181.

The HDD 121 stores map data 21m including road data and navigation data 21p including destination data and guidance information relative to destinations. Herein, the destination data in the navigation data 21p is referred to as a destination database 21d. In addition, the output history data 21h and the contents data 21u are also stored in the HDD 121. Rewriting of the data contents of those data is possible by the input via the operation switch group 107 or remote control terminal 112, or the speech input. In addition, update of the data contents of the HDD 121 is also possible by reading data from a storage medium 120 via the map data input section, which functions as an external information input/output section. In the present embodiment, the information ECU 51 is connected with a serial communication bus 127 functioning as an in-vehicle local communication network via an communication interface 126; thereby, the ECU 51 can communicate data with other in-vehicle control units such as a body ECU and an engine control ECU (none shown).

In addition, a communication ECU 190 as a wireless access means having a wireless transceiver section for Internet accesses is connected to the serial communication bus 127. The browser software program 109d is included in the flash memory 109. By designating as the corresponding website the relevant URL, the information provision server 500 in FIG. 2 can be accessed via the communication ECU 190. The contents file can be thereby browsed. With respect to the file contents (i.e., the website contents), an image such as a static image and moving image (i.e., video image) is outputted via the monitor 110 while a sound is outputted from a speaker 115 via an amplifier 125. Thus, the monitor 110 and speaker 115 individually may function as an example of an information output means or section.

The monitor 110 includes a color liquid crystal display unit to display a present position mark of the vehicle inputted from the position detection section 101, map data 21m inputted from the HDD 121, and attached data such as a guidance route displayed on a map, in superimposition. In addition, like the above-mentioned, the touch panel 123 is overlapped with a display screen and function buttons for destination designation, display setting, various function calls, display window changing operations, etc. can be also displayed if needed.

In the vehicle-side information output apparatus 534, a navigation program 109a is activated by the CPU 181 of the information ECU 51. The driver selects a desired destination from the destination database 21d by operation of the operation switch group 107 or remote control terminal 112 or the speech input via the microphone 131. For example, when a route guidance process for displaying a destination route on the monitor 110 is selected from a menu window displayed on the monitor 110, the following processes take place. That is, when the driver inputs a destination based on a map or destination designation display window on the monitor 110, a present position of the vehicle is obtained based on data of the satellites obtained from a GPS receiver 105. A process for searching for an optimal route from the present position to the destination is executed. A guidance route is displayed on a road map on the monitor 110 in superimposition. The optimal guidance route suitable for the driver is thus indicated. The technique of automatically designating the optimal route uses, for instance, the known Dijkstra method. At least either the monitor 110 or the speaker 115 is used to notify the user of operation guidance or messages according to an operating state.

Figure 5:
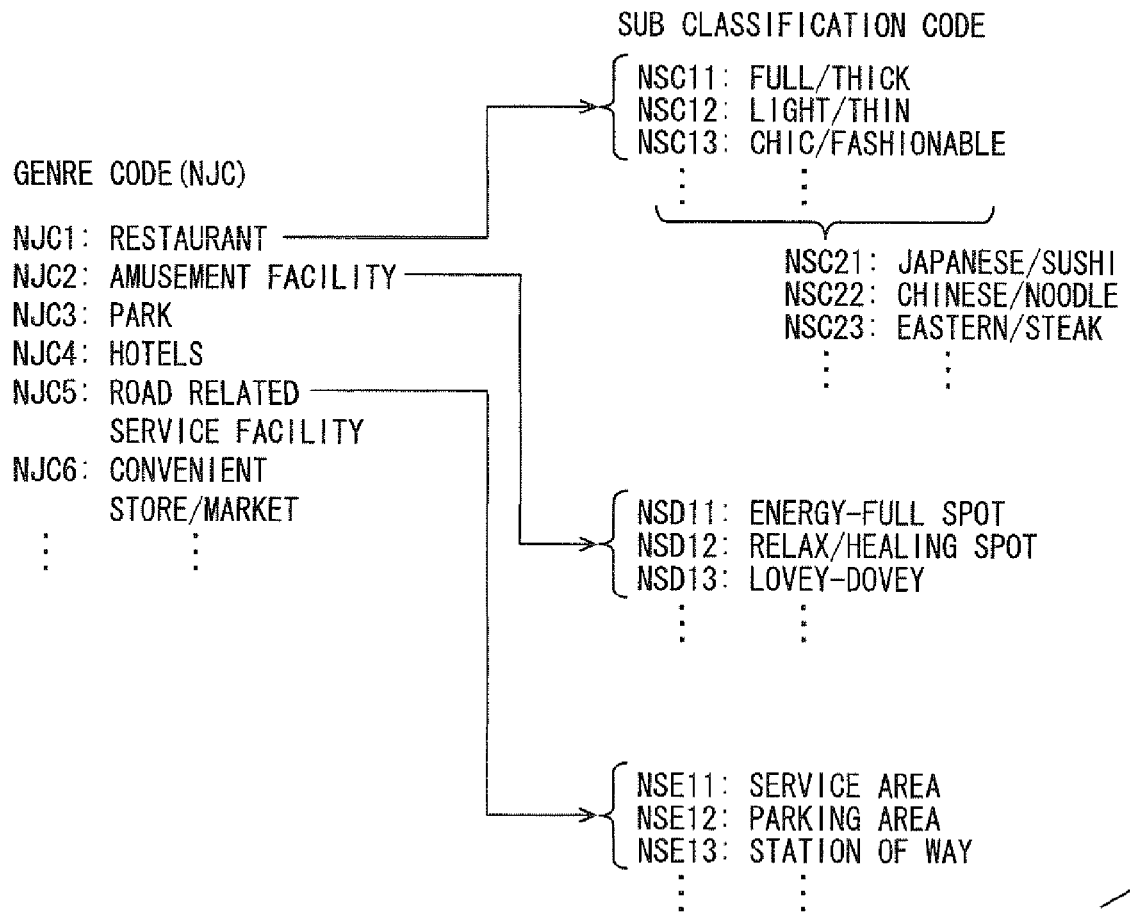
FIG. 5 is a schematic diagram illustrating an example of a data structure of navigation data.

FIG. 5 illustrates data contents of the destination database 21d. The location information relative to each destination is assigned with (i) an ID for identification, (ii) classification information, and (iii) a keyword group. The above keyword group relative to each destination includes several keywords used for interest extraction. Such keywords, which have close relation with each destination, are selected from the keyword group registered in the keyword dictionary 109c in FIG. 3.

In contrast, the classification information includes a genre code (JC) and a sub classification code (SC). The genre code is used to classify facilities as destinations with facility kinds such as "restaurant", "amusement facility", "park", "hotel or accommodation", "road related service facility", "convenience store", and "supermarket". Among them, "restaurant", "road related service facility", "convenience store" and "supermarket" can be treated as a facility allowing dining or eating and drinking.

In addition, each genre code is assigned with matching sub classification codes. For instance, with respect to "restaurant", the kinds of the sub classification codes are designated in consideration of the "hospitality" effect such that a destination can be selected in association with a user's physical condition or mental condition. That is, suppose a restaurant which should be suitably selected when a user has a good appetite (especially youth/manhood) and the hunger degree is increased. Such a restaurant may be assigned with a sub classification code having a tendency being full or thick, which gives priority to the feeling of fullness. In contrast, suppose a restaurant which should be suitably selected when a user is not in a good condition and is not in a good appetite (especially woman) (in other words, when a user is not so hungry. Such a restaurant may be assigned with a sub classification code having a tendency being light or slight, which gives priority to a lighter meal. In addition, suppose a restaurant which should be suitably selected when a user is depressed and would like to change the feeling or a couple would like to increase a lovely feeling. Such a restaurant may be assigned with a sub classification code having a tendency being chic or fashionable, which gives priority to the atmosphere. Further, another sub classification code can be designated based on the general food or cooking kinds such as "Japanese-style food and the sushi", "Chinese and ramen noodles", and "European food and steak".

In contrast, with respect to a facility for providing a service related to recreation or entertainment such as amusement facility, sightseeing spot, park, etc., the kinds of the sub classification codes are also designated such that a destination can be selected in association with a user's physical condition or mental condition. That is, the sub classification code ("energy full spot") which gives priority to the physical or mental divergence may be assigned to a facility which should be selected when a user is in a good physical condition and would like to be provided with a cheerful and active service (especially youth/manhood). Suppose a facility which should be suitably selected when a user is tired or not in a good physical condition (especially woman etc.). Such a restaurant may be assigned with a sub classification code having a tendency being relaxing or healing, which gives priority to restriction against exhausting of physical strength. In addition, a facility which should be suitably used when a couple would like to increase the good feeling may be assigned with a sub classification code focusing on the atmosphere of lovey-dovey spot.

Further, "road related service facility" may be assigned with sub classification codes such as "service area", "parking area", "station of the way", and "drive-in".

Figure 11A:
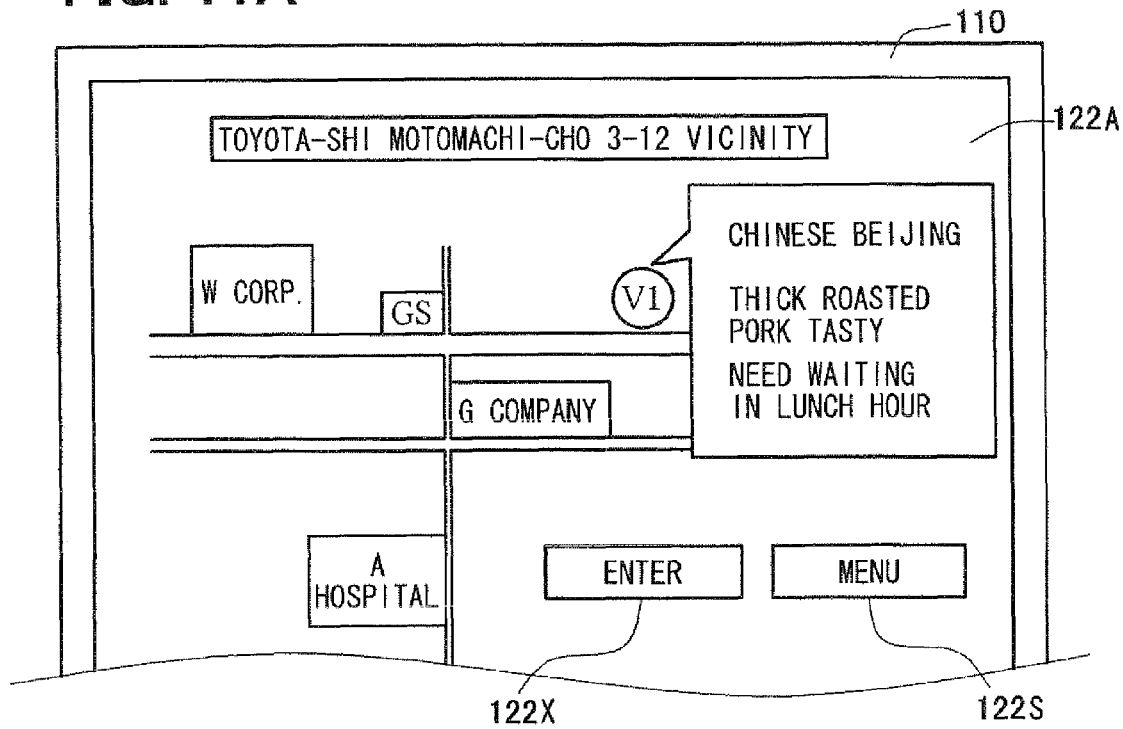
FIG. 11A is an example of a destination designation display window responding to the first output example.

In addition, the destination database 21*d* stores, with respect to each facility or destination, the contents explanatory information (the facility service provision information). As illustrated in FIG. 11A, the contents explanatory information corresponding to the selected destination is displayed on the display window (or synthesis speech is outputted). The service contents of the relevant facility can be confirmed before designating a destination, thereby helping the user select the destination.

Next, the output history data 21*h* in the HDD 121 stores or accumulates with respect of each of fixed number of destinations (e.g., 30 to 300), a destination visit history (also referred to as a destination history) indicating the number of visits within a predetermined time period (e.g., one to five years) up to now, in association with visiting date, user name, facility genre classification, and the number of visits. Update of the output history data 21*h* may be executed when the guidance to the relevant destination is completed by the navigation apparatus. For example, in the update, the destination visit history is written in the output history data 21*h*, or the number of visits is incremented if the relevant destination is previously existing. In addition, to identify a user, a face of the user of each seat is photographed with a camera in a passenger compartment of the vehicle and the photographed image is subjected to a known facial authentication technology. In this case, a user needs to register his/her facial image and name in a registration section in the flash memory 109 or the like in advance. In addition, the browsing history of an Internet website is stored in the output history data 21*h*, for instance, in association with a URL, destination name, and browse date, although none is shown.

In addition, the contents data 21*u* in the HDD 121 stores to accumulate the contents files of websites, which have been related with previously visited destinations and browsed (i.e., downloaded contents files), and is able to be read as needed. Further, the contents data 21*u* stores, as provision information, video data, music reproduction data, etc. in addition to the contents of the websites, in association with destination names and keyword groups of reflecting user's interest.

Figure 6:
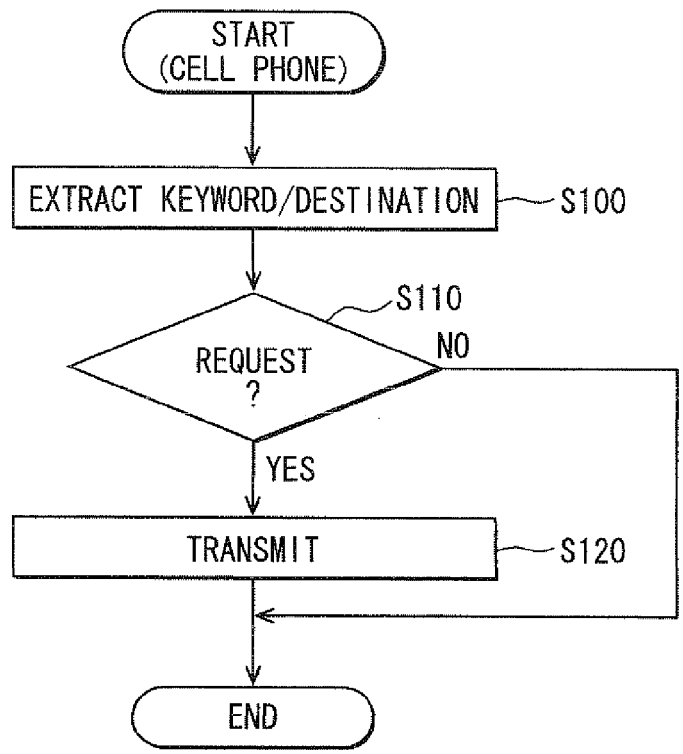
FIG. 6 is a flowchart showing a process in the cellular phone.

Hereafter, an operation of the information providing system 100 for a vehicle is explained. FIG. 6 illustrates a process in the cellular phone 3. Each time a telephone call is made, the conversation contents are transformed into character strings and decomposed into words. Such character strings or words are collated with the keyword dictionary 321*c* to thereby extract keywords. The extracted keywords are stored in the keyword statistical data 321*a* (in FIG. 4A) (S100) In the above, the keyword extraction is performed only for the conversation input by the user via the telephone transmitter 304, which functions as a microphone or an information input means or portion. Without being limited, the keyword extraction can be performed also for the conversation input by the call partner. In contrast, if the website is browsed, the URL is recorded in the access statistical data 321*b* (in FIG. 4B). Herein, the address information can be inputted using the keyboard 305 as an information input means or portion.

As explained above, the control section 310 of the cellular phone 3 along with the telephone transmitter 304, the keyboard 305, or any other information input means of the cellular phone 3 can function as an example of an input information acquisition means for acquiring input information based on (i) a speech of a user's telephone call using the cellular phone and (ii) address information of a user's browse to an external network using the cellular phone.

With respect to the keywords recorded in the keyword statistical data 321*a* or URLs recorded in the access statistical data 321*b*, those having a great number of times of appearances (e.g., that having the greatest number of times of appearances) are transmitted as user interest information to the vehicle or in-vehicle information output apparatus 534 at various occasions. For instance, the following several examples are explained.

(1) The transceiver section 535 of the vehicle-side information output apparatus 534 outputs search electric waves periodically for polling inside or outside the vehicle. When receiving a reply from the transceiver section 341 of the cellular phone 3' the relevant interest information is required. In addition, when the cellular phone 3 has a function as an internet server, a reverse access from the vehicle-side information output apparatus 534 can be made to the cellular phone 3. Thus, the vehicle-side information output apparatus 534 can actively acquire the user interest information from the cellular phone 3.

(2) A sensor such as a seating sensor or camera is provided in a passenger compartment of the vehicle for detecting a user or occupant. When the user's riding in the vehicle is detected, a trigger electric wave is transmitted from the transceiver section 535 of the vehicle-side information output apparatus 534. When receiving a reply from the transceiver section 341 of the cellular phone 3, the relevant interest information is required.

(3) When the ignition switch is turned ON from an OFF state (IG-ON or ACC-ON), a trigger electric wave is transmitted from the transceiver section 535 of the vehicle-side information output apparatus 534. When receiving a reply from the transceiver section 341 of the cellular phone 3, the relevant interest information is required. In any case, the cellular phone 3 responds to the request from the vehicle-side information output apparatus 534 (S110) and thereby transmits user interest information to the vehicle-side information output apparatus 534 (S120).

Figure 8:
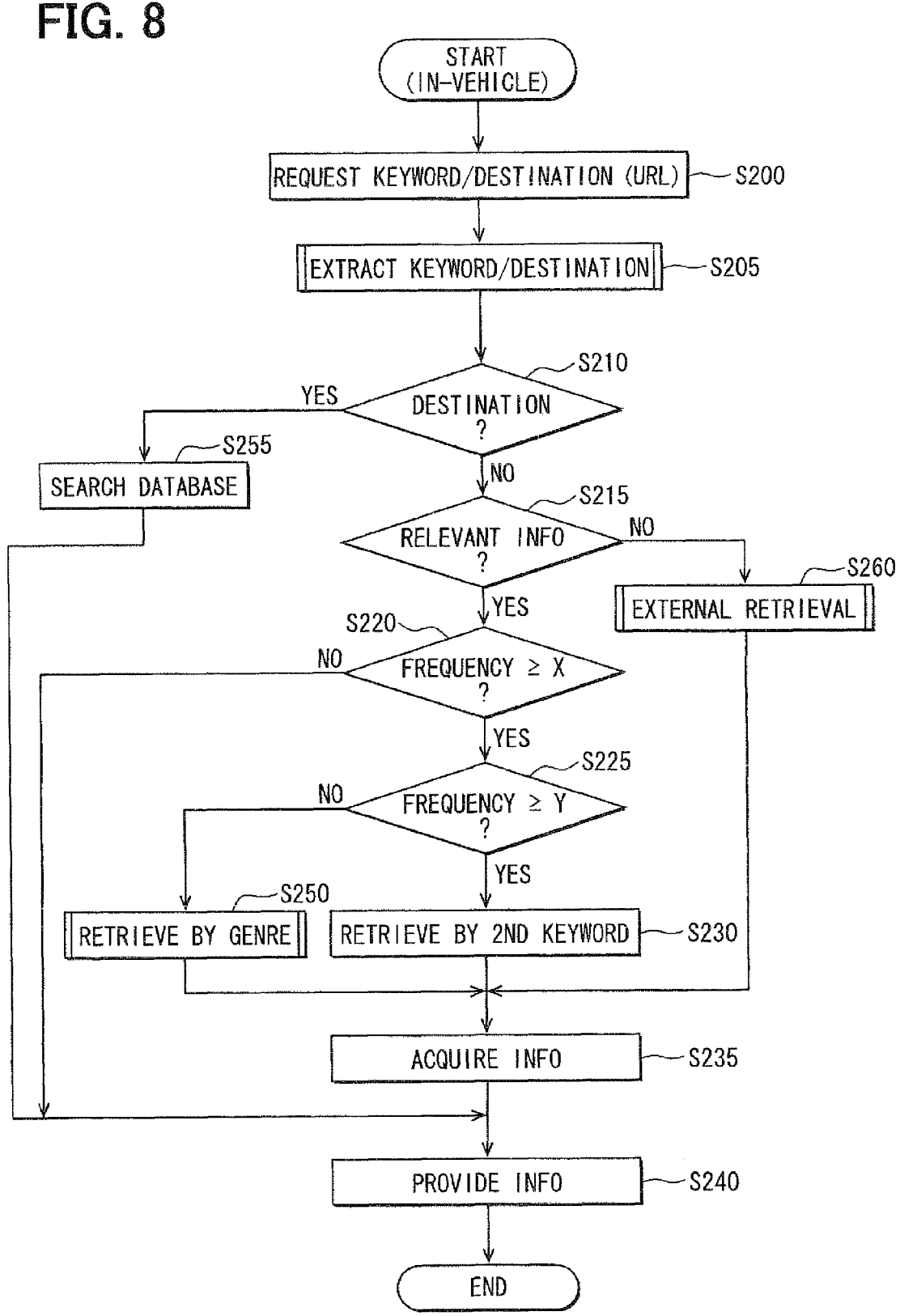
FIG. 8 is a flowchart showing a process in the information output apparatus.

FIG. 8 illustrates a process of the vehicle-side information output apparatus 534. The vehicle-side information output apparatus 534 requests either the keyword or URL (destination) as user interest information at S200. Whichever the keyword or URL can be determined as needed. In consideration that a target of an interest can be directly specified by using a URL more easily than a keyword, when a user has URL (destination) access histories equal to or greater than a threshold value, one of relevant URLs is requested first. The keyword is requested when the URL access history is less than the threshold value. Even in such a case, when the provision information presented to the user is eventually refused by the user (i.e., when the user issues completion or suspension command without selecting output for the provision information), the keyword, which is substituted for the URL (destination), is requested to the cellular phone 3 for the re-retrieval. In addition, in a similar process, either the URL or keyword to be selected can be determined via the cellular phone 3.

At S205, it is determined which of the keyword and URL (destination) is received as the user interest information from the cellular phone 3. If the URL (destination) is received, the processing advances to S255, at which the corresponding destination (i.e., corresponding provision information) is retrieved from the destination database 21d and the list is displayed on the monitor 110. Then the user is urged to select one.

Figure 7:
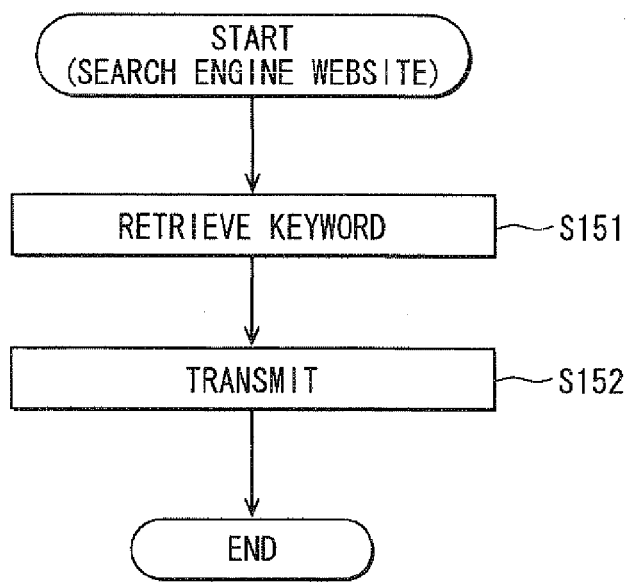
FIG. 7 is a flowchart showing a process in a retrieval site.

When it is determined that the keyword is received at S205, a destination including the keyword which is extracted as having the greatest frequency (or greatest repetitions) is to be retrieved from the destination database 21d. When the destination which matches the keyword is not found at S215, the processing advances to S260, at which an external information retrieval is performed outside of the vehicle; namely, the destination is to be retrieved widely on the Internet via a search engine website outside of the vehicle or in-vehicle information output apparatus 534. FIG. 7 illustrates a process of a search engine website. That is, the website to match the keyword is to be retrieved at S151. The result is transmitted to the vehicle-side information output apparatus 534 at S152.

In contrast, when the destination matching the keyword is retrieved at S215, the processing advances to S220. Herein, an internal retrieval process is performed; namely, the retrieval is performed in the contents data in the HDD 121 inside of the vehicle or in-vehicle information output apparatus 534. The visit frequency (i.e., the number of visits) is investigated with reference to the destination visit (destination) history in the output history data 21h in FIG. 9. When the visit frequency is less than a first threshold value X (for example, X=2), the processing advances to S240 directly, at which, the relevant destinations are displayed in a list in the monitor 110 and the selection by the user is urged at S235.

In contrast, when the visit frequency is equal to or greater than the first threshold value X at S220, the processing advances to S225. At S225, it is then determined whether the visit frequency is equal to or greater than a second threshold value Y (e.g., Y=4). When the visit frequency is less than (i.e., not equal to or greater than) the second threshold value Y, the processing advances to S250. Herein, an extended retrieval is performed which is performed in the genre to which the hit destination belongs (i.e., sub classification code, genre code); thus, a destination not matching the relevant keyword is also included as a retrieval target. The retrieval result is displayed in a list in the monitor 110 and the selection by the user is urged at S235.

When it is determined at S225 that the visit frequency is equal to or greater than the second threshold value Y, it is determined that the destination outdates for the user, advancing to S230. Herein, an extended retrieval is made which is performed by extending the destinations by the logical addition of the first above-mentioned keyword and a second keyword, which has the second greatest visit frequency. The retrieval result is displayed in a list in the monitor 110 and the selection by the user is urged at S235.

Figures 9, 10:
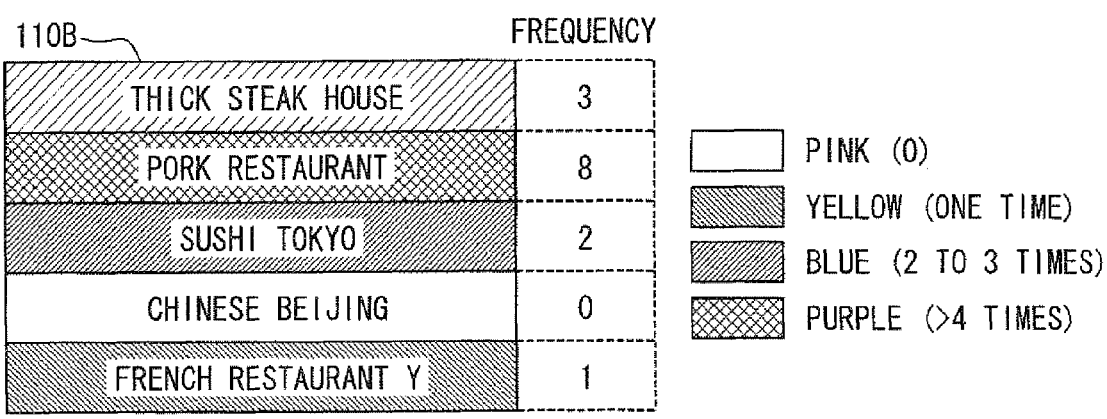
FIG. 9 is a schematic diagram illustrating an example of a data structure of output history data.
FIG. 10 is a schematic diagram illustrating a first output example of a retrieval result.

FIG. 10 illustrates an example of a display window for a list, which shows selection buttons 110B for individual destinations in the list in association with the past visit frequencies being distinguishable from each other. For instance, the selection buttons 110B of the destinations are classified in colors according to visit frequencies. The user touches the corresponding button in the touch panel 123 to thereby change to a display window 122A for a destination designation window in FIG. 11A. When a determination button (i.e., ENTER) 122X is operated, the destination designation is determined; thus, a guidance can be started.

Figure 11B:
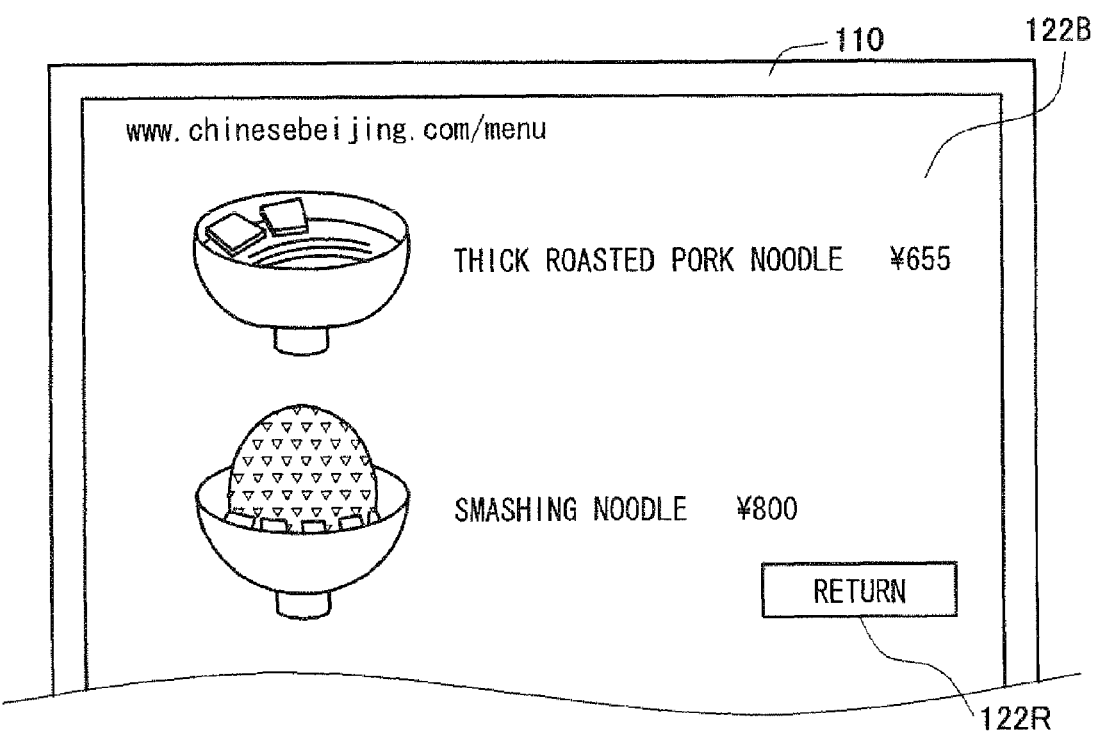
FIG. 11B is an example of a contents display window of a web site.

Further, when another provision information of the relevant destination is available, an access button 122S is additionally illustrated in the display window for accessing the relevant provision information. When the button 122S is operated, the relevant provision information can be outputted. For example, when the provision information is related to the contents of the Internet website, the access button 122S is formed as a link button to the relevant website. For instance, in FIG. 11A, the destination is a restaurant. To allow the user to see the menu of the restaurant, the link to the menu introduction webpage as part of the contents of the restaurant may be assigned to the access button 122S. In such a case, when the access button 122S is operated, the vehicle-side information output apparatus 534 can wirelessly access the contents provision server 500 which provides the contents of the website. As illustrated in FIG. 11B, a menu page or menu display window 122B appears in the monitor 110.

In addition, when the contents file of the website acquired by the past access is stored in the contents data 21u in the HDD 121, the stored contents file is read out from the HDD 121 and outputted via the monitor 110 without need of accessing the contents provision server 500. However, when the previous access is outdated before a predetermined time and date, the relevant contents file is acquired by an access to the contents provision server 500 and outputted to the monitor 110. In addition, the outdated contents file is updated by overwrite of the contents file re-downloaded at this time.

Next, as illustrated in FIG. 12, there may be a case that destinations more than the threshold value are retrieved only with the first keyword to thereby make it difficult to select a suitable destination. In this case, destination candidates may be narrowed down by the logical AND of the first keyword and the second keyword. In FIG. 12, display examples of three destination lists (i.e., selection buttons 110B) are shown when the second keyword is assigned to "tire", "hot spring", and "skiing", respectively, while the first keyword is assigned to "snow".

FIG. 13 illustrates a display example of a destination designation window 122C at the time of designating, as a destination, one of the tire shops, which are listed when narrowing down by the second keyword "tire". The shopping page is also prepared in the website of this tire shop; therefore, an access button 122S is illustrated as a link button to the shopping page. FIG. 14 illustrates a display image 122D of the relevant shopping page.

In addition, in the process of narrowing down, the information relative to the history of accesses to the related information via the external search website service may be provided from a third party. To that end, as illustrated in FIG. 12, an auxiliary access button 110E is illustrated as a link button to access the website which can acquire the related information. For example, the keywords of "snow" and "tire" are transmitted to a retrieval website, the retrieval website retrieves the website of the related goods (for example, studless tire) and generates statistical data in which the access frequency of the retrieved website is reflected. Then, among the related goods, the URL of the website having the greatest access frequency is returned to the vehicle-side information output apparatus 534. In response, the vehicle-side information output apparatus 534 generates to illustrate the above-mentioned auxiliary access button 110E. FIG. 15 illustrates a display image 122E in the monitor 110 when the auxiliary access button 110E is operated.

Figure 16:
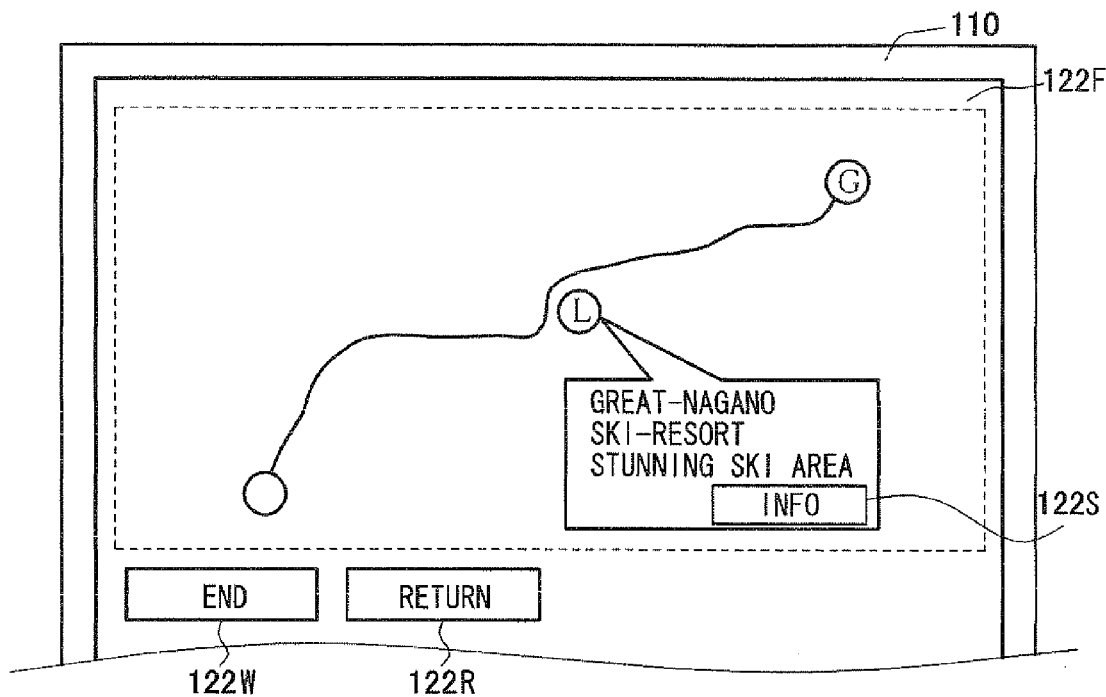
FIG. 16 is an example of a destination designation display window responding to the third output example.
Figure 17:
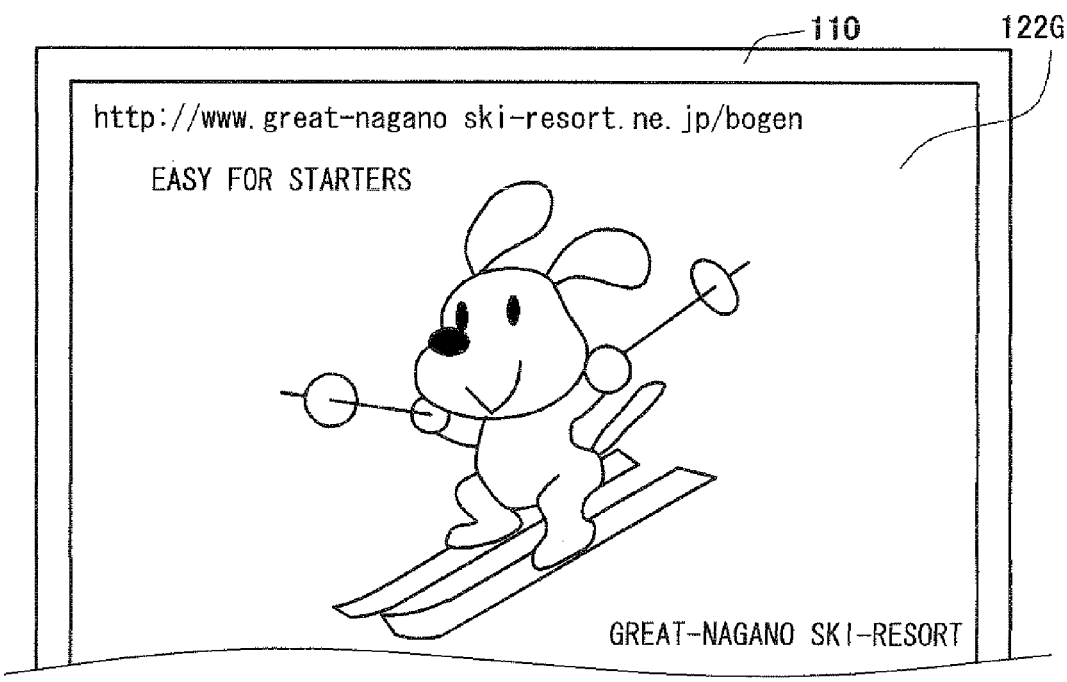
FIG. 17 is an example of a contents display window of a web site.

FIG. 16 illustrates a display example of a destination designation window 122F at the time of designating, as a destination, one of the ski resorts, which are listed when narrowing down by the second keyword "skiing". An access button 122S is illustrated as a link button to the website of the relevant ski resort. FIG. 17 illustrates a display image 122G in the monitor 110 when the access button 122S is operated.

Figure 18:
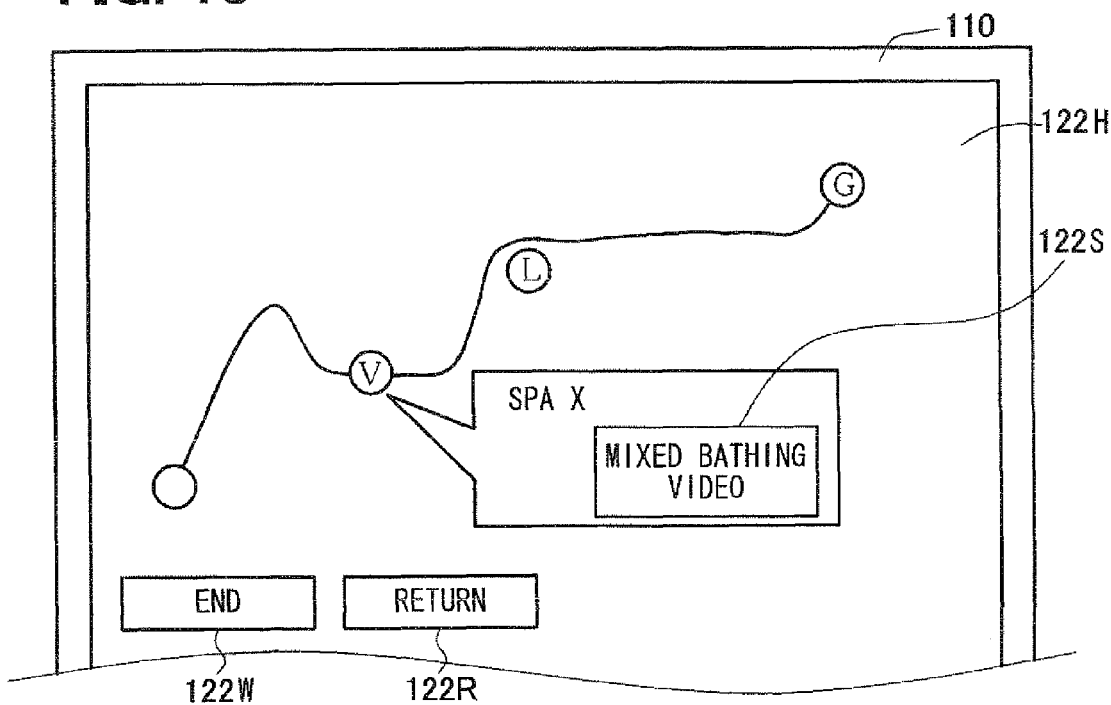
FIG. 18 is an example of a destination designation display window responding to the fourth output example.
Figure 19:
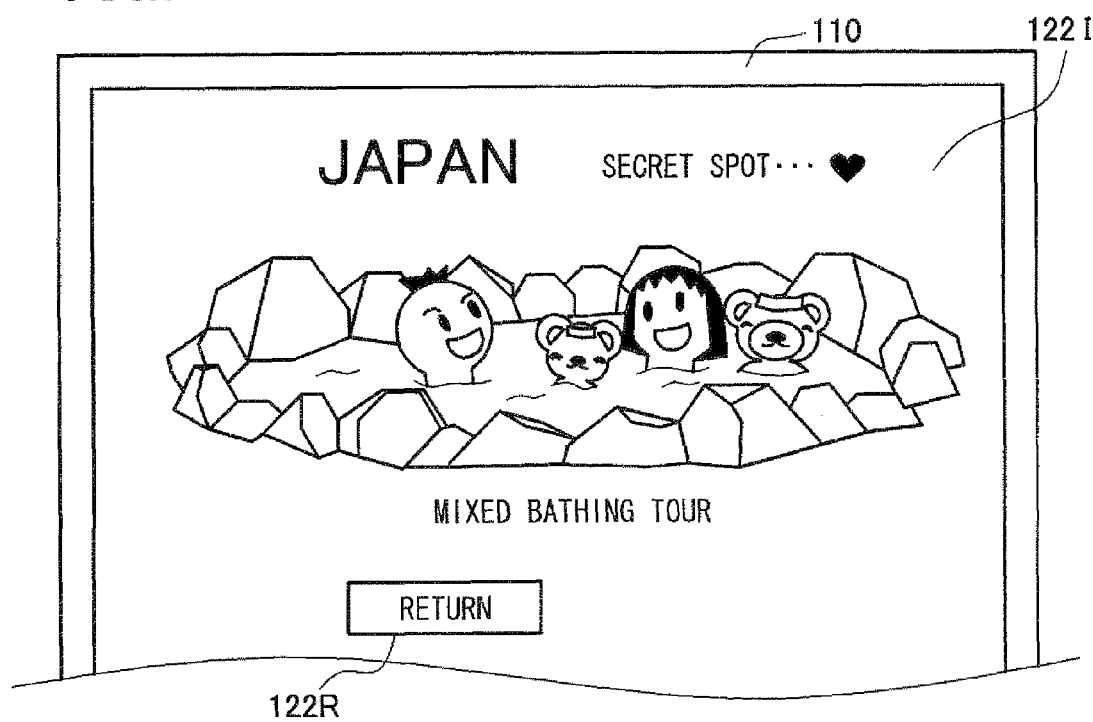
FIG. 19 is an image output example.

FIG. 18 illustrates a display example of a destination designation window 122H at the time of designating, as a destination, one of the hot spring resorts, which are listed when narrowing down by the second keyword "hot spring". Here, the access button 122C is illustrated to access the image information related to the hot spring stored in the contents data 21u of the HDD 121. FIG. 19 illustrates a display example of the image 122I appearing by operating the access button 122S in FIG. 18.

In the above embodiment, the cellular phone 3 is used for extracting user interest information. Without need of being limited, another method can be adopted as follows. The parent population for interest extraction may be wirelessly transmitted from the cellular phone 3 to the vehicle-side information output apparatus 534; then, extracting user interest information may be performed in the vehicle-side information output apparatus 534. In this case, the interest analysis software program 314e and the keyword dictionary 321c may be removed from the cellular phone 3. Instead, as shown in FIG. 3, the interest analysis software program 109b and the keyword dictionary 109c may be provided in the vehicle-side information output apparatus 534. In addition, the retrieval results by using the keyword can be further performed by using the third keyword or subsequent ones if needed.

Further, a spoken speech or sounds of the conversation between the user and call partner may be recorded in any memory of the cellular phone in a digitized form without undergoing any speech recognition process. The digitized conversation sounds can be regarded as one of the parent population data for interest extraction. Then, as needed, the digitized conversation sounds are transmitted to the vehicle-side information output apparatus 534 and then can be speech-recognized using the speech recognition unit 130 in the vehicle-side information output apparatus 534 (i.e., navigation apparatus).

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

Aspects of the disclosure described herein are set out in the following clauses.

As an aspect of the disclosure, an information providing system for a vehicle is provided as follows. The system includes (i) an in-vehicle information output apparatus mounted to the vehicle and (ii) a cellular phone capable of communicating with the in-vehicle information output apparatus. Further, an input information acquisition section is provided in the cellular phone for acquiring input information based on at least one of (i) a speech of a user's telephone call using the cellular phone located not only inside but also outside of the vehicle and (ii) address information of a user's browse to an external network using the cellular phone located not only inside but also outside of the vehicle. A population accumulation section is provided in the cellular phone for accumulating, as a parent population data, input information acquired by the input information acquisition section within a predetermined period up to a present time. An interest information extraction section is provided in the cellular phone or the in-vehicle information output apparatus for extracting interest information reflecting a present interest of the user from the accumulated parent population data for interest extraction. A provision information collection section is provided in the in-vehicle information output apparatus for collecting provision information, which matches the extracted interest information. An information output section is provided in the in-vehicle information output apparatus for outputting the collected provision information in an image, a sound, or a combination of an image and a sound.

In the above configuration, the cellular phone accumulates input information inputted within a predetermined period up to now by a user as parent population data for interest extraction without being limited to the inside of the vehicle, and extracts interest information reflecting present interests of the user from the parent population data for interest extraction. In contrast, the in-vehicle or vehicle-side information output apparatus collects provision information, which matches the extracted interest information, and provides the user of the vehicle with the collected provision information. The cellular phone is an electronic apparatus, which a user brings about and uses daily for a telephone call, Internet retrieval, etc. For example, information inputted in the cellular phone using voices (i.e., speeches) or manual operations reflects interests, which the user presently holds, in much more in detail than the history of operating a car navigation apparatus does. Such input information is used for extracting interest information of the user; thus, information reflecting the user's newest hobby and interest not only inside but also outside the vehicle can be collected more densely. The information providing system or service can thus respond to a variety of user tastes appropriately.

As an optional aspect, in the information providing system, the interest information extraction section may be provided in the cellular phone. A cellular phone side communication section may be further provided in the cellular phone for transmitting the extracted interest information to the vehicle: and a vehicle side communication section may be further provided in the in-vehicle information output apparatus for receiving the interest information transmitted from the cellular phone.

In this case, extraction of the user interest information can be completed by the cellular phone before the user gets in the relevant vehicle or car. Only the extraction result can be transmitted to the vehicle, thereby decreasing the data volume in the communication between the cellular phone and the vehicle. In contrast, the vehicle-side information output apparatus, which receives the extraction result, can advance to the process which collects the matching provision information promptly. As a result, there is an advantage which can output suitable provision information promptly.

As an optional aspect, in the information providing system, the interest information extraction section may be provided in the in-vehicle information output apparatus. A cellular phone side communication section may be further provided in the cellular phone for transmitting the parent population for interest extraction to the vehicle. A vehicle side communication section may be further provided in the in-vehicle information output apparatus for receiving the parent population for interest extraction transmitted from the cellular phone.

In this case, the in-vehicle information output apparatus performs user interest information extracting process, therefore, decreasing the load of the control section (CPU) of the cellular phone having a restricted throughput.

As an optional aspect, in the information providing system, a bi-directional short range wireless communication network or link may be further configured to wirelessly communicate the cellular phone and the in-vehicle information output apparatus with each other directly via the individual communication sections.

In this case, data exchange of the information required for the interest information extraction is performed directly between the cellular phone and the vehicle-side information output apparatus by the wireless communication. Collection and output of the provision information matching the interest of the user can be performed promptly. In the above configuration, the "bi-directional short range wireless communication network" can be a Personal Area Network (PAN) specified in IEEE (Institute of Electrical and Electronic Engineers) 802.15. For example, Bluetooth (proprietary name: standards are provided in IEEE 802.15.1) can be adopted especially suitably for the above configuration. Herein, it is necessary to have individual Bluetooth interfaces in the cellular phone and the vehicle-side information output apparatus. Especially for the cellular phone, it is also possible to have an Bluetooth adapter which can be attachable to a connector of the cellular phone.

As an optional aspect, in the information providing system, each of the cellular phone and the in-vehicle information output apparatus may communicate with an external network, and the individual communication sections of the cellular phone and the in-vehicle information output apparatus may indirectly communicate with each other by wirelessly entering the external network.

Almost recently available cellular phones have a function to access the Internet; thus, such a function can be used for the purpose of the above configuration of the system.

As an optional aspect, in the information providing system, an in-vehicle provision information storage section may be further provided in the in-vehicle information output apparatus for storing the provision information. The provision information collection section may be configured to retrieve and collect the provision information based on the interest information by referring to the in-vehicle provision information storage section.

Herein, the in-vehicle provision information storage is provided in the in-vehicle information output apparatus. If the provision information matching the extracted user interest information exists within the in-vehicle information storage, it can be promptly read out and outputted.

As an optional aspect, in the information providing system, an information provision server may be provided in an external network, which the cellular phone and the in-vehicle output system are allowed to access. The information collection section may be configured to retrieve and collect the provision information based on the interest information by referring to the information provision server.

Such a configuration can eliminate a need of having an in-vehicle provision information storage section in the in-vehicle information output apparatus for retrieving and collecting the provision information. Further, even when the in-vehicle provision information storage section is prepared in the in-vehicle information output apparatus, other provision information which is not contained by the internal storage section can be acquired by accessing the information provision server.

As an optional aspect, in the information providing system, the input information acquisition section may include a microphone, which functions as a telephone transmitter of the cellular phone. The microphone may acquire the speech of the telephone call by the user. A speech recognition section may be further provided in the cellular phone or the in-vehicle information output apparatus for performing speech recognition of the speech acquired by the microphone of the cellular phone to speech-recognize input information. A keyword extraction section may be further provided in the cellular phone or the in-vehicle information output apparatus for extracting a keyword for determining user's interest from the speech-recognized input information. The parent population accumulation section may include a keyword accumulation portion to accumulate the extracted keyword.

Thus, the contents of the telephone call inputted via the microphone of the cellular phone are speech-recognized to be transformed to the character string, a keyword is then extracted from the speech-recognized input information for determining the user's interest. Therefore, such a keyword can be extracted from the user's daily conversation outside the vehicle typically occupying much longer time period than that inside the vehicle; thereby, the user's interest can be appropriately specified as the accumulated keywords.

As an optional aspect, in the information providing system, the provision information collection section may be configured to retrieve provision information to be collected based on the keyword extracted by the keyword extraction section. The interest information extraction section may be configured to analyze an appearance frequency of the keyword accumulated in the keyword accumulation portion, and give a higher priority to a keyword having a greater appearance frequency, the priority being used when the provision information collection section collects the provision information.

Herein, by using the keyword having a greater (i.e., higher) frequency of appearances under the conversation, the present user's interest can be specified more appropriately.

As an optional aspect, in the information providing system, the interest information extraction section may include a keyword dictionary storage portion which stores a keyword dictionary for covering a keyword group previously selected for interest extraction. The keyword extraction section may be configured to perform a decomposition to decompose the speech-recognized input information into words and collate a result of the decomposition with the keyword dictionary, to thereby selectively extract a keyword covered by the keyword dictionary.

The conversation of the user includes a relatively restricted number of keywords or keyword group, which is useful for estimating user's interests. If a keyword dictionary is prepared previously and a keyword covered by the keyword dictionary is extracted selectively, the user's interest can be specified or retrieved more appropriately.

As an optional aspect, in the information providing system, the interest information extraction section may include (i) a keyword update information acquiring portion for acquiring periodically update information relative to at least one of a most recent topic, a season, and a fashion, via an external network, and (ii) a keyword update portion for updating the keyword dictionary based on the acquired update information.

Herein, the data contents of the keyword dictionary can be always adjusted according to the change of the season, fashion, or the newest topic, and timely interest extraction can be thus performed.

As an optional aspect, in the information providing system, the provision information collection section may be configured to retrieve the provision information using a first keyword having a greatest appearance frequency, from among keywords extracted by the keyword extraction section within a most recent predetermined period.

Further, as an optional aspect, in the information providing system, the provided information collection section may be configured to retrieve the provision information using a second keyword having a second greatest appearance frequency next to the first keyword, when a number of retrieval hits in retrieving the provision information using the first keyword exceeds a predetermined threshold value.

Such a configuration can anticipate the case that the number of retrieval hits of the provision information may exceed the number of threshold value only by using the first keyword.

As an optional aspect, in the information providing system, the input information acquisition section may include an information input portion of address information for browsing an Internet website as the external network wirelessly accessible from the cellular phone. The parent population accumulation section may include a website browsing history accumulation portion to accumulate a browsing history of an Internet website.

Herein, the newest browsing history (i.e., record) of the Internet website using the cellular phone can reflect the user's interest deeply. Therefore, by using it as the parent population for interest extraction, the present user's interest can be specified or retrieved appropriately.

Incidentally, the interest or concern of the user riding on the vehicle is relatively focused on a destination or a passing point, even if a destination has been already determined.

As an optional aspect, in the information providing system, a navigation section may be provided in the in-vehicle information output apparatus for navigating the vehicle. The provision information collection section may be configured to retrieve and collect, in the navigation section, destination information as provision information, the destination information matching the interest information.

This configuration can navigate the user to the destination which matches the extracted user's interest appropriately.

As an optional aspect, in the information providing system, a wireless access section may be further provided in the in-vehicle information output apparatus for accessing a website on an Internet. The provision information collection section may be configured to retrieve and collect, on the Internet, website information as provision information, the website information matching the interest information.

Thereby, according to the extracted interest, the access to the Internet website which matches it can be made timely, satisfying the user.

Herein, it is possible to read out and reproduce the data of the image or music from the library of the in-vehicle provision information storage section. Furthermore, it is also possible to download the data of image or music via the external network and reproduce it.

As an optional aspect, in the information providing system, an output history information record section may be further provided in the in-vehicle information output apparatus for recording output history information of the provision information outputted by the information output section. The provision information collection section may be configured to collect preferentially provision information having an output frequency within a newest predetermined period, the output frequency being less than a predetermined first threshold value by referring to the output history information in the output history information record section.

In addition, while the same user rides in the vehicle repeatedly, the same provision information may be eventually outputted repeatedly. Thereby, a fresh provision information item can become available to the same user.

As an optional aspect, in the information providing system, the provision information collection section may be configured to perform a first retrieval using the extracted interest information. The provision information collection section may be further configured to, when as a result of the first retrieval, a number of retrieval hits to retrieve provision information having an output frequency being less than the first threshold value within the newest predetermined period, is less than a predetermined threshold value, perform a second retrieval by using a narrowing down condition, which is alleviated (or extended in retrieval area) from a narrowing down condition used for the first retrieval.

It will be obvious to those skilled in the art that various changes may be made in the above-described embodiments of the present invention. However, the scope of the present invention should be determined by the following claims.

What is claimed is:

1. An information providing system for a vehicle, the system including (i) an in-vehicle information output apparatus mounted to the vehicle and (ii) a cellular phone capable of communicating with the in-vehicle information output apparatus, the information providing system comprising:

an input information acquisition section provided in the cellular phone for acquiring input information based on at least one of (i) a speech of a user's telephone call using the cellular phone located inside or outside of the vehicle and (ii) address information of a user's browser to an external network using the cellular phone located inside or outside of the vehicle, the input information acquisition section including a microphone, which functions as a telephone transmitter of the cellular phone, the microphone acquiring the speech of the telephone call by the user;

a population accumulation section provided in the cellular phone for accumulating, as a parent population data, input information acquired by the input information acquisition section within a predetermined period up to a present time;

an interest information extraction section provided in the cellular phone or the in-vehicle information output apparatus for extracting interest information reflecting a present interest of the user from the parent population data for interest extraction accumulated by the population accumulation section;

a provision information collection section provided in the in-vehicle information output apparatus for collecting provision information, which matches the extracted interest information;

an information output section provided in the in-vehicle information output apparatus for outputting the provision information collected by the provision information collection section in an image, a sound, or a combination of an image and a sound;

a speech recognition section provided in the cellular phone or the in-vehicle information output apparatus for performing speech recognition of the speech acquired by the microphone of the cellular phone to speech-recognize input information; and a keyword extraction section provided in the cellular phone or the in-vehicle information output apparatus for extracting a keyword for determining user's interest from the speech-recognized input information;

the population accumulation section including a keyword accumulation portion to accumulate the extracted keyword;

the provision information collection section being configured to retrieve provision information to be collected based on the keyword extracted by the keyword extraction section, the interest information extraction section being configured to analyze an appearance frequency of the keyword accumulated in the keyword accumulation portion, and give a higher priority to a keyword having a greater appearance frequency, the priority being used when the provision information collection section collects the provision information.

2. The information providing system according to claim 1, wherein the interest information extraction section is provided in the cellular phone,
the information providing system further comprising:
a cellular phone side communication section provided in the cellular phone for transmitting the extracted interest information to the in-vehicle information output apparatus: and
a vehicle side communication section provided in the in-vehicle information output apparatus for receiving the interest information transmitted from the cellular phone.

3. The information providing system according to claim 1, wherein the interest information extraction section is provided in the in-vehicle information output apparatus,
the information providing system further comprising:
a cellular phone side communication section provided in the cellular phone for transmitting the accumulated parent population for interest extraction to the vehicle; and
a vehicle side communication section provided in the in-vehicle information output apparatus for receiving the accumulated parent population for interest extraction transmitted from the cellular phone.

4. The information providing system according to claim 2, further comprising:
a bi-directional short range wireless communication network configured to wirelessly communicate the cellular phone and the in-vehicle information output apparatus with each other directly via the individual communication sections.

5. The information providing system according to claim 2, each of the cellular phone and the in-vehicle information output apparatus communicating with an external network, the individual communication sections of the cellular phone and the in-vehicle information output apparatus indirectly communicating with each other by wirelessly entering the external network.

6. The information providing system according to claim 1, the information providing system further comprising:
an in-vehicle provision information storage section provided in the in-vehicle information output apparatus for storing the provision information,
the provision information collection section being configured to retrieve and collect the provision information based on the interest information by referring to the in-vehicle provision information storage section.

7. The information providing system according to claim 1, the information providing system further comprising:
an information provision server provided in an external network, which the cellular phone and the in-vehicle output system are allowed to access,
the provision information collection section being configured to retrieve and collect the provision information based on the interest information by referring to the information provision server.

8. The information providing system according to claim 1, the interest information extraction section including a keyword dictionary storage portion which stores a keyword dictionary for covering a keyword group previously selected for interest extraction,
the keyword extraction section being configured to
perform a decomposition to decompose the speech-recognized input information into words and
collate a result of the decomposition with the keyword dictionary, to thereby selectively extract a keyword covered by the keyword dictionary.

9. The information providing system according to claim 8, the interest information extraction section including
(i) a keyword update information acquiring portion for acquiring periodically update information relative to at least one of a most recent topic, a season, and a fashion, via an external network, and
(ii) a keyword update portion for updating the keyword dictionary based on the acquired update information.

10. The information providing system according to claim 1,
the provision information collection section being configured to retrieve the provision information using a first keyword having a greatest appearance frequency, from among keywords extracted by the keyword extraction section within a most recent predetermined period.

11. The information providing system according to claim 10,
the provided information collection section being configured to retrieve the provision information using a second keyword having a second greatest appearance frequency next to the first keyword, when a number of retrieval hits in retrieving the provision information using the first keyword exceeds a predetermined threshold value.

12. The information providing system according to claim 1,
the input information acquisition section including an information input portion of address information for browsing an Internet website as the external network wirelessly accessible from the cellular phone,
the parent population accumulation section including a website browsing history accumulation portion to accumulate a browsing history of an Internet website.

13. The information providing system according to claim 1, further comprising:
a navigation section provided in the in-vehicle information output apparatus for navigating the vehicle,
the provision information collection section being configured to retrieve and collect, in the navigation section, destination information as provision information, the destination information matching the interest information.

14. The information providing system according to claim 1, further comprising:
a wireless access section provided in the in-vehicle information output apparatus for accessing a website on an Internet,
the provision information collection section being configured to retrieve and collect, on the Internet, website information as provision information, the website information matching the interest information.

15. The information providing system according to claim 1, further comprising:
an output history information record section provided in the in-vehicle information output apparatus for recording output history information of the provision information outputted by the information output section,
the provision information collection section being configured to preferentially collect provision information having an output frequency within a newest predetermined period, the output frequency being less than a predetermined first threshold value, by referring to the output history information in the output history information record section.

16. The information providing system according to claim 15,
the provision information collection section being configured to perform a first retrieval using the extracted interest information,
the provision information collection section being further configured to,
when as a result of the first retrieval, a number of retrieval hits to retrieve provision information having an output frequency being less than the first threshold value within the newest predetermined period, is less than a predetermined threshold value,
perform a second retrieval by using a narrowing down condition, which is alleviated from a narrowing down condition used for the first retrieval.

17. A method for outputting provision information for a user in a vehicle in cooperation with a cellular phone of the user, the method comprising:
acquiring input information based on at least one of (i) a speech of a user's telephone call using the cellular phone located not only inside but also outside of the vehicle and (ii) address information of a user's browser to an external network using the cellular phone located not only inside but also outside of the vehicle;
accumulating, as a parent population data, input information acquired within a predetermined period up to a present time;
extracting interest information reflecting a present interest of the user from the accumulated parent population data for interest extraction;
collecting provision information, which matches the extracted interest information; and
outputting, for the user located in the vehicle, the collected provision information in an image, a sound, or a combination of an image and a sound, wherein
said acquiring step utilizes a microphone, which functions as a telephone transmitter of the cellular phone, the microphone acquiring the speech of the telephone call by the user;
speech recognition is performed of the speech acquired by the microphone of the cellular phone to speech-recognize input information;
a keyword is extracted from the acquired recognized speech for determining user's interest;
extracted keywords are accumulated;
provision information is retrieved and collected based on the extracted keyword;
an appearance frequency of the accumulated keywords is analyzed; and
a higher priority is given to a keyword having a greater appearance frequency, the priority being used when collecting provision information.

18. An information providing system for a vehicle, the system including (i) an in-vehicle information output apparatus mounted to the vehicle and (ii) a cellular phone capable of communicating with the in-vehicle information output apparatus,
the information providing system comprising:
an input information acquisition section provided in the cellular phone for acquiring input information based on at least one of (i) a speech of a user's telephone call using the cellular phone located inside or outside of the vehicle and (ii) address information of a user's browser to an external network using the cellular phone located inside or outside of the vehicle;
a population accumulation section provided in the cellular phone for accumulating, as a parent population data, input information acquired by the input information acquisition section within a predetermined period up to a present time;
an interest information extraction section provided in the cellular phone or the in-vehicle information output apparatus for extracting interest information reflecting a present interest of the user from the parent population data for interest extraction accumulated by the population accumulation section;
a provision information collection section provided in the in-vehicle information output apparatus for collecting provision information, which matches the extracted interest information;
an information output section provided in the in-vehicle information output apparatus for outputting the provision information collected by the provision information collection section in an image, a sound, or a combination of an image and a sound; and
an output history information record section provided in the in-vehicle information output apparatus for recording output history information of the provision information outputted by the information output section,
the provision information collection section being configured to preferentially collect provision information having an output frequency within a newest predetermined period, the output frequency being less than a predetermined first threshold value, by referring to the output history information in the output history information record section.

19. The information providing system according to claim 18,
the provision information collection section being configured to perform a first retrieval using the extracted interest information,
the provision information collection section being further configured to,
when, as a result of the first retrieval, a number of retrieval hits to retrieve provision information having an output frequency being less than the first threshold value within the newest predetermined period, is less than a predetermined threshold value,
perform a second retrieval by using a narrowing down condition, which is alleviated from a narrowing down condition used for the first retrieval.

\* \* \* \* \*